(12) United States Patent
Fink et al.

(10) Patent No.: US 8,366,144 B2
(45) Date of Patent: Feb. 5, 2013

(54) SIDE CURTAIN AIRBAG WITH FABRIC DIFFUSER

(75) Inventors: Michael Fink, Mesa, AZ (US); Ryan T. Pinsenschaum, Dayton, OH (US); Douglas S. Weston, Tipp City, OH (US); Dayne B. Hassett, Sandy, UT (US); Brian Abraham, Fariborn, OH (US)

(73) Assignee: Nxgen Technologies, LLC, Mesa, AZ (US)

( * ) Notice: Subject to any disclaimer, the term of this patent is extended or adjusted under 35 U.S.C. 154(b) by 111 days.

(21) Appl. No.: 12/818,309

(22) Filed: Jun. 18, 2010

(65) Prior Publication Data

US 2011/0062689 A1    Mar. 17, 2011

Related U.S. Application Data

(63) Continuation-in-part of application No. 11/190,499, filed on Jul. 26, 2005, now Pat. No. 7,784,822, and a continuation-in-part of application No. 12/256,224, filed on Oct. 22, 2008, now Pat. No. 7,971,899, and a continuation-in-part of application No. 12/780,411, filed on May 14, 2010.

(60) Provisional application No. 61/218,711, filed on Jun. 19, 2009.

(51) Int. Cl.
    *B60R 21/16* (2006.01)
(52) U.S. Cl. ..................................... 280/730.2
(58) Field of Classification Search .................. 280/729, 280/730.2, 736, 740, 742
    See application file for complete search history.

(56) References Cited

U.S. PATENT DOCUMENTS

| | | | |
|---|---|---|---|
| 5,348,342 A | 9/1994 | Haland et al. | |
| 5,378,019 A | 1/1995 | Smith et al. | |
| 5,421,610 A | 6/1995 | Kavanaugh et al. | |

(Continued)

FOREIGN PATENT DOCUMENTS

| | | |
|---|---|---|
| EP | 1462321 A1 | 9/2004 |
| GB | 2395170 A | 5/2004 |

(Continued)

OTHER PUBLICATIONS

International Search Report for PCT/US2010/034925 dated Jan. 18, 2011.

(Continued)

*Primary Examiner* — Paul N Dickson
*Assistant Examiner* — Robert A Coker
(74) *Attorney, Agent, or Firm* — Cantor Colburn LLP

(57) ABSTRACT

An inflatable cushion for a side of a vehicle is provided, the inflatable cushion having: a first cushion section formed from a first sheet of material secured to a second sheet of material, the first cushion section having a plurality of separate inflatable cells each of which having an inlet opening for receipt of an inflation gas; an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first sheet of material and an upper portion of the second sheet of material; a fabric diffuser member located in the internal passageway, the fabric diffuser member being sealed at one end and open on another end for receipt of an inflation gas, the fabric diffuser being configured to supply the inflation gas to each of the plurality of separate inflatable cells through a plurality of inflation openings, wherein a height of the fabric diffuser in an inflated configuration is less than a length of the fabric diffuser in the inflated configuration and wherein the fabric diffuser is rolled inwardly to define an un-inflated configuration, the height of the fabric diffuser in the un-inflated configuration being less than the height of the fabric diffuser when it is in an inflated configuration.

21 Claims, 11 Drawing Sheets

U.S. PATENT DOCUMENTS

| | | | |
|---|---|---|---|
| 5,788,270 A | 8/1998 | Haland et al. |
| 5,992,881 A | 11/1999 | Faigle |
| 6,010,149 A | 1/2000 | Riedel et al. |
| 6,073,961 A | 6/2000 | Bailey et al. |
| 6,099,029 A | 8/2000 | Haland et al. |
| 6,135,493 A | 10/2000 | Jost et al. |
| 6,152,481 A | 11/2000 | Webber et al. |
| 6,164,688 A | 12/2000 | Einsiedel et al. |
| 6,170,860 B1 | 1/2001 | Denz et al. |
| 6,220,629 B1 | 4/2001 | Wipasuramonton et al. |
| 6,237,937 B1 | 5/2001 | Kokeguchi et al. |
| 6,293,581 B1 | 9/2001 | Saita et al. |
| 6,312,009 B1 | 11/2001 | Haland et al. |
| 6,325,409 B1 | 12/2001 | Fischer |
| 6,334,625 B1 | 1/2002 | Pausch et al. |
| 6,378,895 B1 | 4/2002 | Brucker et al. |
| 6,394,487 B1 | 5/2002 | Heudorfer et al. |
| 6,402,190 B1 | 6/2002 | Heudorfer et al. |
| 6,402,192 B2 | 6/2002 | Haland et al. |
| 6,409,211 B1 | 6/2002 | Sheng et al. |
| 6,431,589 B1 | 8/2002 | Heigl et al. |
| 6,450,529 B1 | 9/2002 | Kalandek et al. |
| 6,457,742 B1 | 10/2002 | Brucker |
| 6,467,802 B2 | 10/2002 | Heigl |
| 6,481,743 B1 | 11/2002 | Tobe et al. |
| 6,494,480 B2 | 12/2002 | Haland et al. |
| 6,502,857 B2 | 1/2003 | Nakanishi et al. |
| 6,543,806 B1 | 4/2003 | Fink |
| 6,554,314 B1 | 4/2003 | Uchiyama et al. |
| 6,595,546 B2 | 7/2003 | Smith |
| 6,616,179 B2 | 9/2003 | Tanase et al. |
| 6,623,031 B2 | 9/2003 | Haland et al. |
| 6,715,786 B1 | 4/2004 | Willibey |
| 6,726,243 B2 | 4/2004 | Dinsdale et al. |
| 6,749,220 B1 | 6/2004 | Wipasuramonton et al. |
| 6,755,436 B2 | 6/2004 | Hess et al. |
| 6,779,562 B2 | 8/2004 | Tietze |
| 6,860,507 B2 | 3/2005 | Uchiyama et al. |
| 6,913,282 B2 | 7/2005 | Takahashi |
| 6,945,556 B2 | 9/2005 | Maertens |
| 6,962,364 B2 | 11/2005 | Ju et al. |
| 7,431,332 B2 | 10/2008 | Wipasuramonton et al. |
| 2001/0026062 A1 | 10/2001 | Kosugi et al. |
| 2002/0024203 A1 | 2/2002 | Takahashi |
| 2002/0101066 A1 | 8/2002 | Tanase et al. |
| 2002/0105174 A1 | 8/2002 | Tanase et al. |
| 2002/0149180 A1 | 10/2002 | Keshavaraj |
| 2002/0195804 A1 | 12/2002 | Hess et al. |
| 2003/0124929 A1 | 7/2003 | Hurst et al. |
| 2003/0178829 A1 | 9/2003 | Dinsdale et al. |
| 2003/0230876 A1 | 12/2003 | Ohrvall et al. |
| 2003/0234522 A1* | 12/2003 | Thomas .................... 280/730.2 |
| 2004/0104561 A1 | 6/2004 | Maertens |
| 2004/0108694 A1 | 6/2004 | Takahashi |
| 2004/0239082 A1 | 12/2004 | Schneider et al. |
| 2004/0242098 A1 | 12/2004 | Bass |
| 2005/0146118 A1 | 7/2005 | Kitamura et al. |
| 2006/0001244 A1* | 1/2006 | Taguchi et al. ............ 280/730.2 |
| 2006/0017267 A1 | 1/2006 | Fink |
| 2006/0108776 A1 | 5/2006 | Bradbum |
| 2007/0237961 A1 | 10/2007 | Li et al. |
| 2008/0084052 A1 | 4/2008 | Abney et al. |

FOREIGN PATENT DOCUMENTS

| | | |
|---|---|---|
| JP | 11301394 A | 11/1999 |
| JP | 11314555 A | 11/1999 |
| JP | 2000296749 | 10/2000 |
| JP | 2000296750 | 10/2000 |
| JP | 2000296751 | 10/2000 |
| JP | 2000296752 | 10/2000 |
| JP | 2000296753 | 10/2000 |
| JP | 2000296754 | 10/2000 |
| JP | 2001328505 A | 11/2001 |
| JP | 2002067861 A | 3/2002 |
| JP | 2002067863 A | 3/2002 |
| JP | 2003072504 | 3/2002 |
| JP | 2002316609 A | 10/2002 |
| JP | 2003025946 A | 1/2003 |
| JP | 2003306118 | 10/2003 |
| JP | 2007223373 | 9/2007 |
| WO | 03/101791 A1 | 12/2003 |
| WO | 2005039938 A1 | 5/2005 |

OTHER PUBLICATIONS

Written Opinion of the International Searching Authority for PCT/US2010/034925 dated Jan. 18, 2011.
European Search Report No. 05 779 363.0-1523 dated Sep. 14, 2009.
Translation to JP2003-025946.
International Search Report; International Application No. PCT/US2010/038302; International Filing Date: Jun. 11, 2010; Date of mailing: Feb. 8, 2011; 5 pages.
Written Opinion; International Application No. PCT/US2010/038302; International Filing Date: Jun. 11, 2010; Date of mailing: Feb. 8, 2011; 3 pages.

* cited by examiner

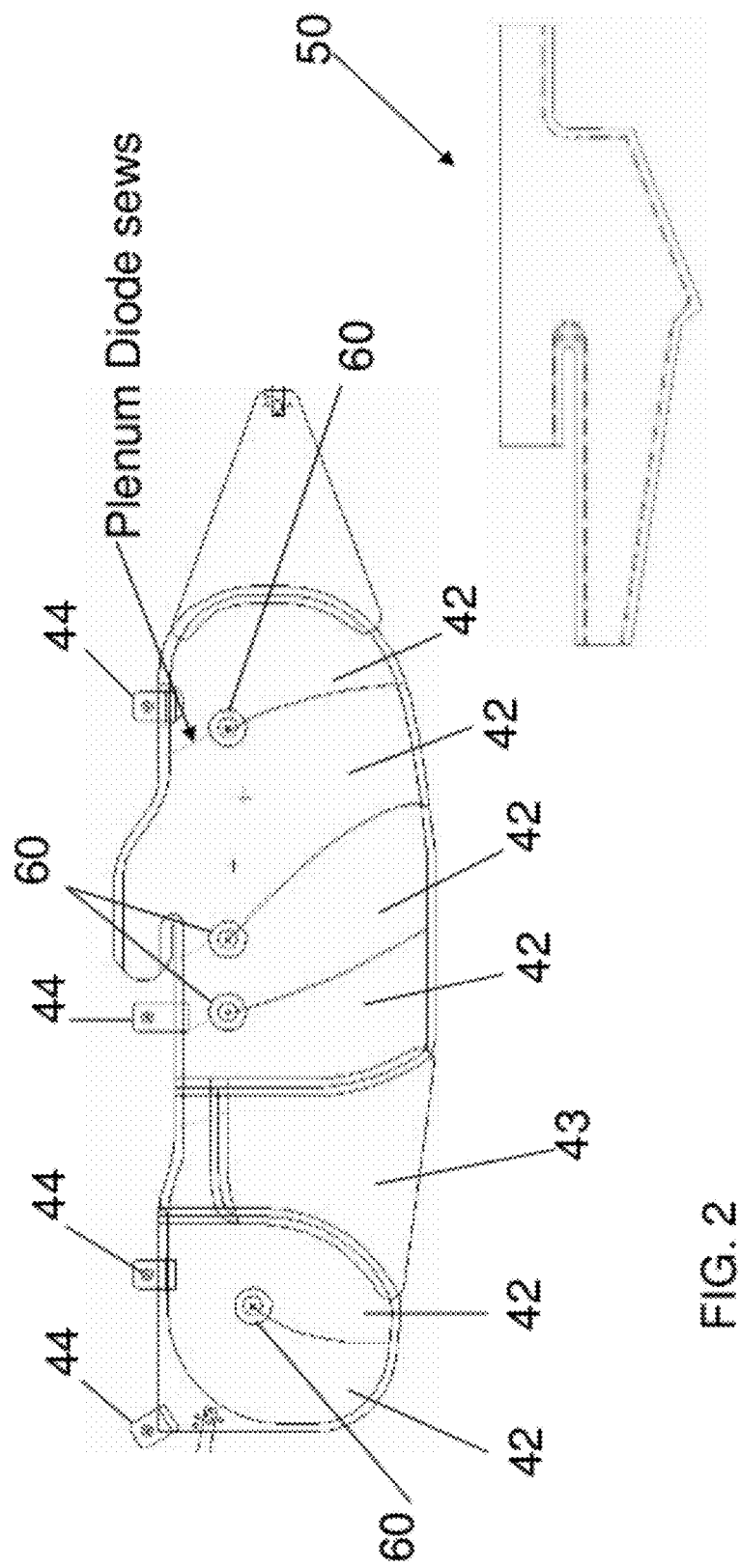

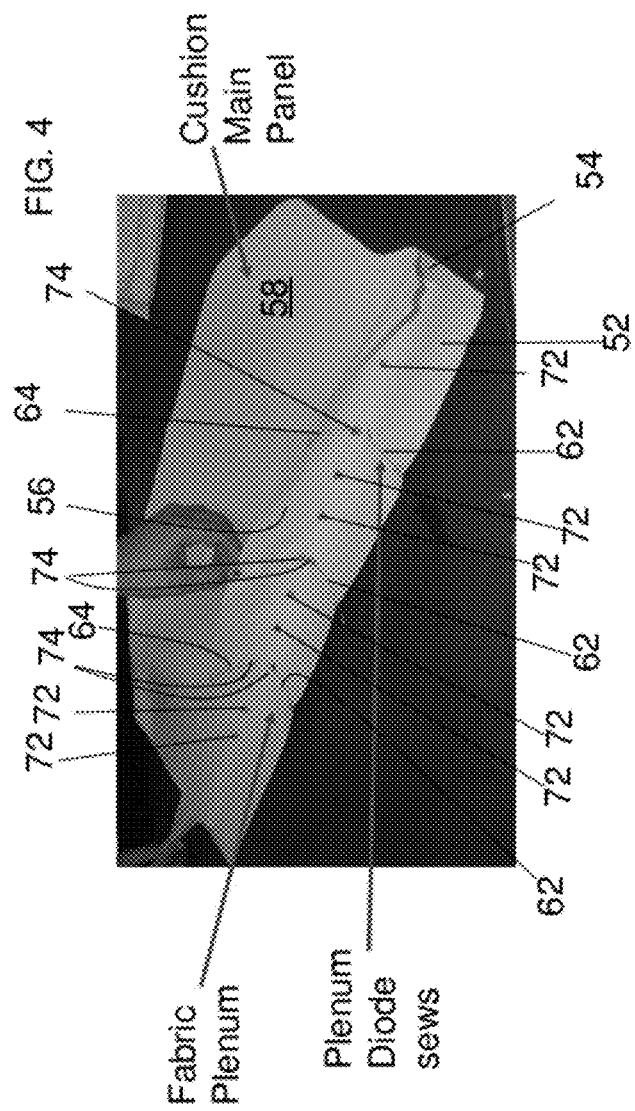

Flexible fabric plenum Concept

- The flexible fabric plenum consists of air flow holes with a specified amount of holes and diameter for each cell and a certain height of diode
- The height of diode, # of vent holes and diameter of holes would depend on air flow distribution feeding time and inflation volume area.
- The flexible fabric plenum is sewn into the two LH and RH Pattern with straight vertical sew lines (the amount of sew lines will depend on the numbers of cushion cells

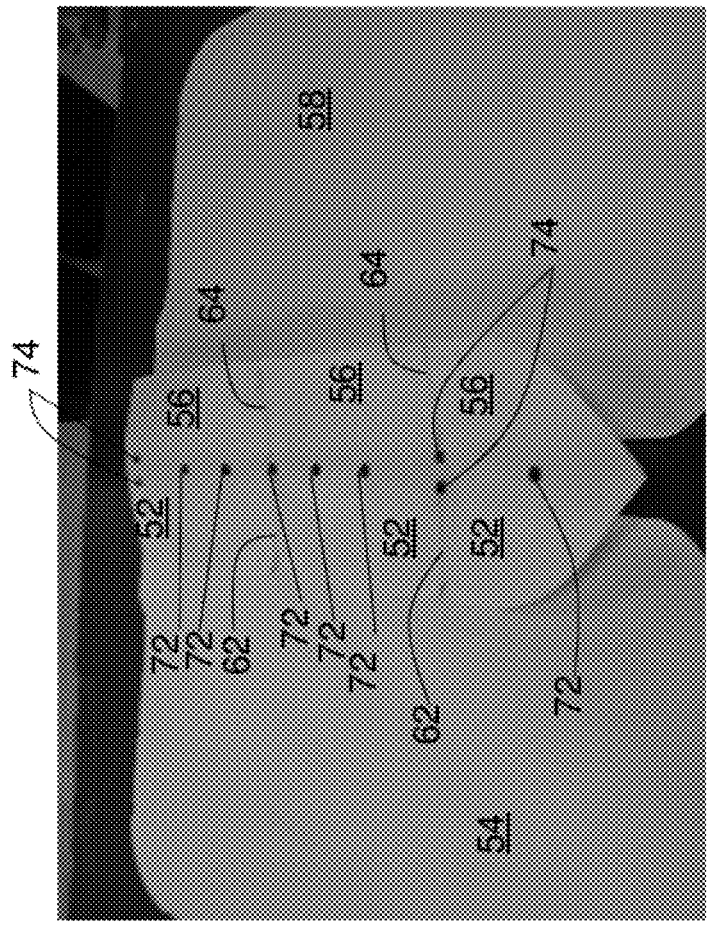

FIG. 5

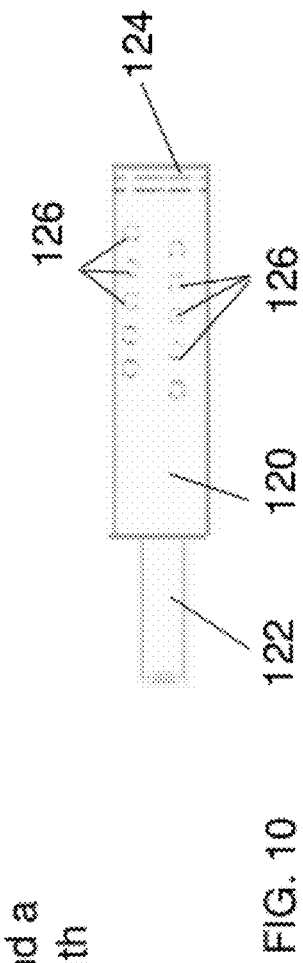
Lined hose with sewn end and a periphery of holes along length
FIG. 10
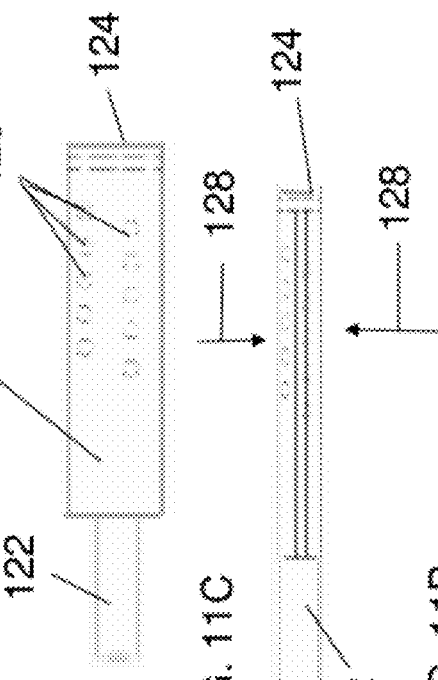
FIG. 11C
FIG. 11B
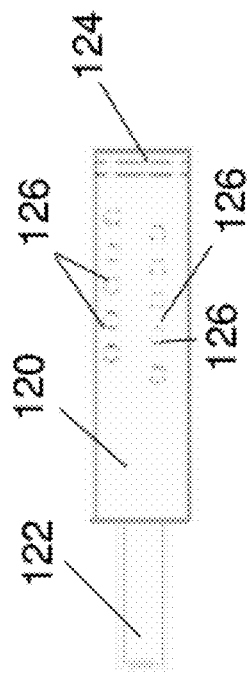
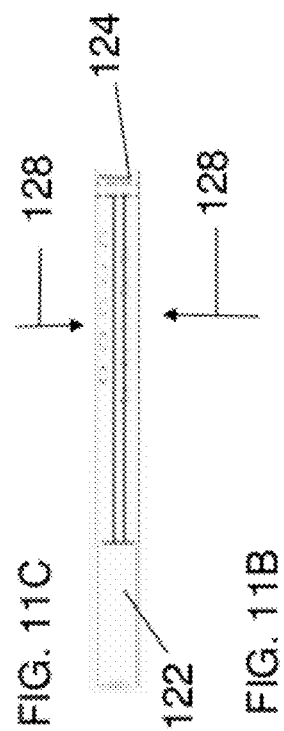
Coated Flat fabric rolled along length with multiple layers with sewn end and a periphery of holes along length
FIG. 11A Coated Flat fabric gathered at ends to create a neck for securing around inflator body with a periphery of holes along surface Coated Flat fabric rolled along length with a sealing agent in between layers to allow expansion of the layers but limit disengagement with a closed end and a periphery of holes along length

SIDE CURTAIN AIRBAG WITH FABRIC DIFFUSER

CROSS REFERENCE TO RELATED APPLICATIONS

This application claims the benefit of U.S. Provisional Patent Application Ser. No. 61/218,711 filed Jun. 19, 2009, the contents of which are incorporated herein by reference thereto.

This application is also a continuation in part of U.S. patent application Ser. No. 12/780,411 filed May, 14, 2010, the contents of which are also incorporated herein by reference thereto.

This application is also a continuation-in-part of U.S. Non-Provisional patent application Ser. No. 11/190,499 filed Jul. 26, 2005 and U.S. Non-Provisional patent application Ser. No. 12/256,224 filed Oct. 22, 2008 the contents each of which are incorporated herein by reference thereto.

BACKGROUND

Exemplary embodiments of the present invention relate generally to a side impact or rollover inflatable curtain airbag and more specifically to apparatus and methods for deploying the same.

Various side impact or rollover airbags (also referred to as side curtains or curtain airbags) provide a cushion between a side of a vehicle and the occupant. Side curtain airbags generally deploy downward from a stowed position within the roofline of vehicle and inflate between the occupant and the vehicle interior side structure, such as the side windows and the A, B and/or C pillars.

A side curtain airbag generally consists of two fabric panels either sewn or interwoven together to create a plurality of inflatable cells. These cells are inflated during a predetermined activation event wherein a signal is provided to inflate the side curtain airbag. A side curtain may have a plurality of cells in various arrangements and/or configurations.

Typical airbag curtain designs have an "open flow" between chamber cells. Open flow as described herein is characterized by the gas or fluid within a cell having open fluid communication with adjacent cells via a diffuser tube and/or fluid paths disposed about the diffuser tube proximate to adjacent cells. This configuration allows the gas to uniformly fill the entire airbag because the gas distributes among all or most of the airbag cells or inflated regions. An example of an open flow conventional airbag is disclosed in FIG. 2 of U.S. Pat. No. 6,481,743 to Tobe et al., the entire disclosure of which is herein fully incorporated by reference.

In some applications, it is desirable to provide a side impact or rollover restraint system having an inflatable curtain airbag that does not have "open flow" between chamber cells. In addition, it is also desirable to provide a diffuser that provides the flow of inflation gases to the inflatable curtain.

SUMMARY OF THE INVENTION

Thus in accordance with exemplary embodiments of the present invention there is provided an inflatable cushion for a side of a vehicle.

In one exemplary embodiment, an inflatable cushion for a side of a vehicle is provided, the inflatable cushion having: a first cushion section formed from a first sheet of material secured to a second sheet of material, the first cushion section having a plurality of separate inflatable cells each of which having an inlet opening for receipt of an inflation gas; an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first sheet of material and an upper portion of the second sheet of material; a fabric diffuser member located in the internal passageway, the fabric diffuser member being sealed at one end and open on another end for receipt of an inflation gas, the fabric diffuser being configured to supply the inflation gas to each of the plurality of separate inflatable cells through a plurality of inflation openings, wherein a height of the fabric diffuser in an inflated configuration is less than a length of the fabric diffuser in the inflated configuration and wherein the fabric diffuser is rolled inwardly to define an un-inflated configuration, the height of the fabric diffuser in the un-inflated configuration being less than the height of the fabric diffuser when it is in an inflated configuration.

In another exemplary embodiment, an inflatable cushion for a side of a vehicle is provided, the inflatable cushion comprising: a first cushion section formed from a first sheet of material secured to a second sheet of material, the first cushion section having a plurality of separate inflatable cells each of which having an inlet opening for receipt of an inflation gas; an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first sheet of material and an upper portion of the second sheet of material; and a fabric diffuser member located in the internal passageway, the fabric diffuser member being sealed at one end and open on another end for receipt of an inflation gas, the fabric diffuser being configured to supply the inflation gas to each of the plurality of separate inflatable cells through a plurality of inflation openings, wherein a height of the fabric diffuser in an inflated configuration is less than a length of the fabric diffuser in the inflated configuration and wherein the fabric diffuser is comprises at least one outer layer of a woven fabric with an inner layer or coating bonded to an inside of the at least one outer layer.

In another exemplary embodiment, an inflatable cushion for a side of a vehicle is provided, the inflatable cushion comprising: a first cushion section formed from a first sheet of material secured to a second sheet of material, the first cushion section having a plurality of separate inflatable cells each of which having an inlet opening for receipt of an inflation gas; an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first sheet of material and an upper portion of the second sheet of material; and a fabric diffuser member located in the internal passageway, the fabric diffuser member being sealed at one end and open on another end for receipt of an inflation gas, the fabric diffuser being configured to supply the inflation gas to each of the plurality of separate inflatable cells through a plurality of inflation openings, wherein a height of the fabric diffuser in an inflated configuration at the one end is greater than a height of the fabric diffuser at the other end and wherein the plurality of inflation openings are located proximate to the one end.

BRIEF DESCRIPTION OF THE DRAWINGS

FIG. 2 is a view of an inflatable cushion in accordance with an exemplary embodiment of the present invention;

FIG. 3 is a view of a fabric plenum in accordance with an exemplary embodiment of the present invention;

FIGS. 4 and 5 are view of partially assembly inflatable cushions in accordance with an exemplary embodiment of the present invention;

FIGS. 10-13 illustrate additional alternative configurations of exemplary embodiments of the present invention.

DETAILED DESCRIPTION OF THE PREFERRED EMBODIMENTS

This application is related to U.S. Non-Provisional patent application Ser. No. 11/190,499 filed Jul. 26, 2005 and U.S. Non-Provisional patent application Ser. No. 12/256,224 filed Oct. 22, 2008 the contents each of which are incorporated herein by reference thereto.

Reference will now be made in detail to exemplary embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
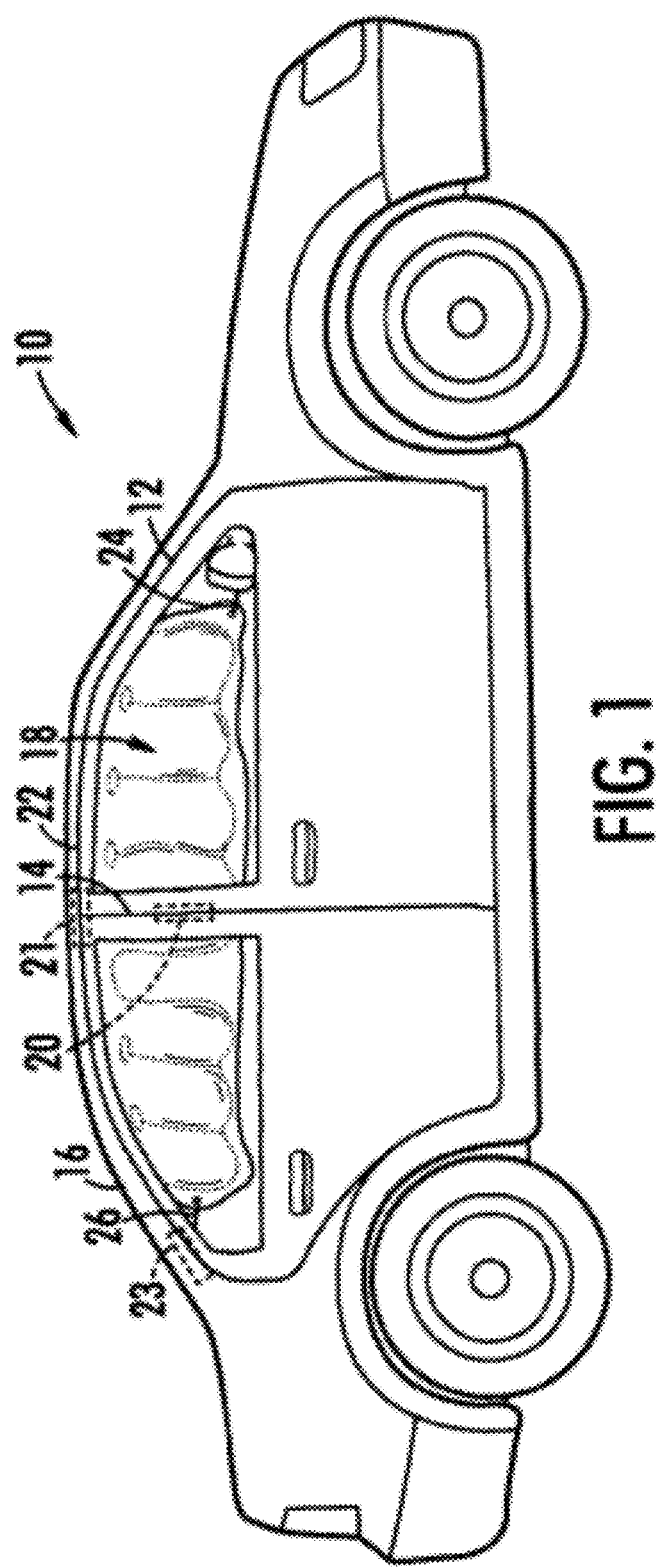
FIG. 1 is a side view of a vehicle with an inflated side curtain airbag.
Figure 6:
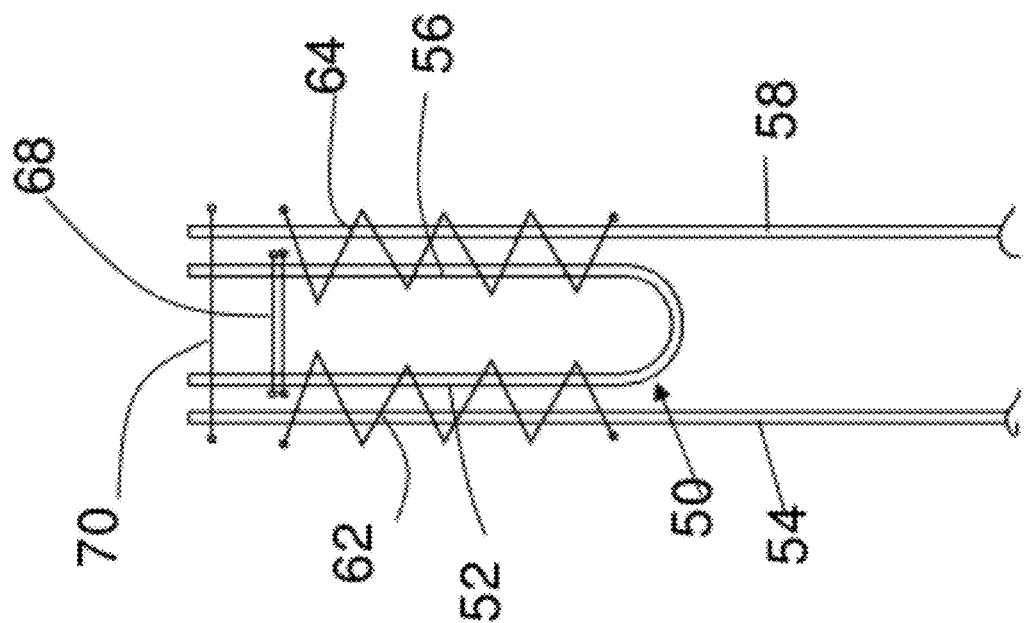
FIG. 6 is a view illustrating securement of the fabric plenum to an inflatable cushion.

Referring to the drawings and particularly to FIG. 1, a vehicle 10 is shown. Vehicle 10 includes an A-pillar 12, a B-pillar 14, and a C-pillar 16. A side curtain airbag or inflatable cushion 18 in accordance with one exemplary embodiment of the present invention is illustrated and extends between A-pillar 12 and C-pillar 16. In FIG. 1, airbag 18 is shown in an inflated state. In this regard, an inflator 20 provides a gas necessary to inflate airbag 18. Inflators 20, 21 and 23 are shown in dashed lines to display alternative locations for the inflator. Thus, the inflator may be located in the B-pillar, in the C-pillar, in the roof, or in another suitable location within vehicle 10.

Before airbag 18 is deployed, it may be stored within roof rail 22 of vehicle 10. Optionally, tethers 24 and 26 may be used to restrain airbag 18. In the embodiment shown in FIG. 1, tethers 24 and 26 attach at one end to airbag 18 and at the other end to the body of the vehicle.

Referring now to FIG. 2, further details of side curtain airbag or inflatable cushion 18 can be most easily explained. Airbag 18 includes a plurality of substantially isolated cells 42. Cells 42 can be configured to a rear bank of cells between B-pillar 14 and C-pillar 16, while other cells 42 make up a front bank of cells between A-pillar 12 and B-pillar 14. An area 43 is not inflated because an occupant is less likely to come into contact with that area. In some embodiments, however, area 43 may be a cell, or may inflate at a time later than the other cells.

Continuing to refer to FIG. 2, another configuration of an inflatable cushion or airbag 18 is illustrated here tabs 44 are provided in this embodiment to attach airbag 18 to roof rail 22. Instead of tabs 44, any suitable method of attachment may be used.

In order to provide gas from the inflator to the cells of the inflatable cushion a fabric diffuser or fabric plenum 50 is provided. FIG. 3 shows one non-limiting embodiment of a fabric diffuser or fabric plenum 50.

In accordance with exemplary embodiments of the present invention, fabric plenums have been shown to be a viable technique to take gas from an inflator, segment the gas from the inflator and distribute to all parts of the cushion, and reduce mass. In an exemplary embodiment, the fabric plenum(s) are used to replace other types of diffuser tubes such as plastic or metal diffuser tubes.

Various embodiments disclosed herein are directed to fabric plenums and/or diffusers that are configured to handle the rapid expansion of gas from an inflator with a larger outlet orifice. Moreover, other embodiments are directed to limiting the amount of inflation gas that travels from one cell to the next.

Referring now to FIGS. 1-9, the fabric plenum is a sewn plenum made from flat fabric and can be integrated into the cushion or free to float. Each cell of the cushion is segmented from the others with relatively very little gas passing from one cell to the next. The fabric plenum is configured to supply the inflation gas from the inflator to the cells of the inflatable cushion, wherein only a limited amount of inflation gas is transferred from cell to cell.

This is accomplished by sewing a first side or first portion 52 of the plenum or diffuser to a first sheet of material 54 of the cushion and a second portion or side 56 of the plenum to second sheet of material 58 of the cushion. The gas can be essentially shut off from adjacent cells by sewing the diode circles or semi-circular patterns 60 to the first and second sheet of the inflatable cushion as well as plenum diode sews wherein the first portion of the plenum is stitched directly to the first sheet by vertical stitches 62 and the second portion of the plenum is stitched directly to the second sheet by vertical stitches 64 or this approach can be used to just partially close off the communication between cells by not sewing the diode circles and half moon closeouts into the plenum.

Thereafter the plenum is closed by securing the first portion 52 to the second portion 54 by stitches 68 that only secure the first portion of the plenum to the second portion of the plenum and then the upper portion of the first sheet of material are secured to the upper portion of the second sheet of material via stitches 70.

Figure 7:
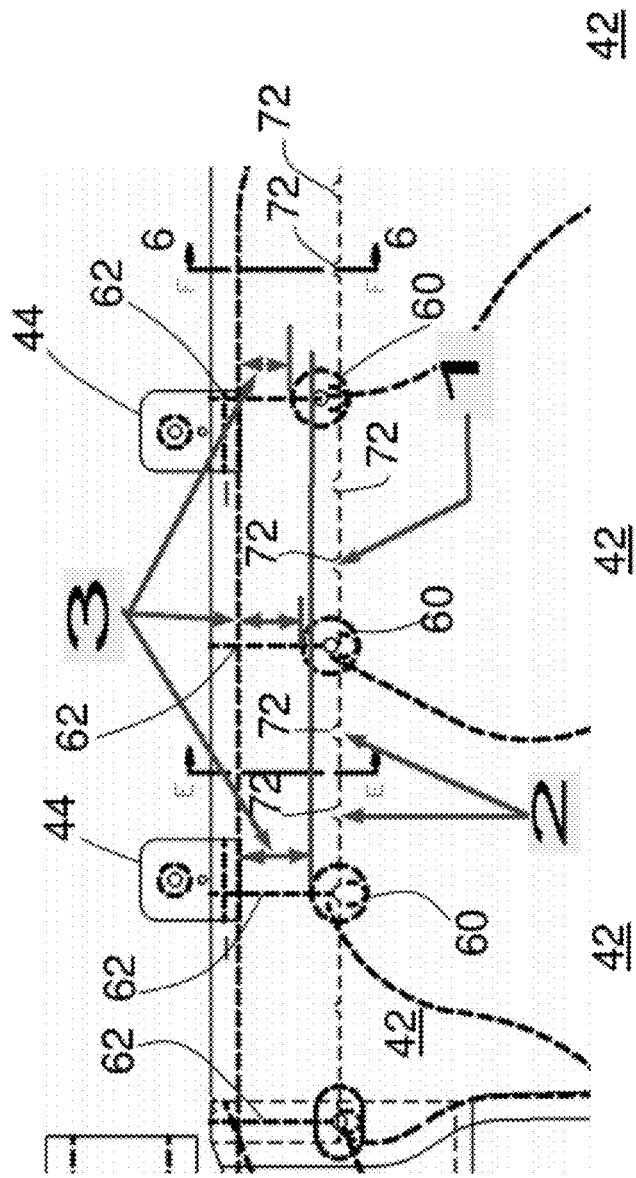
FIGS. 7 and 8 are views of illustrating an inflatable cushion with a fabric plenum in accordance with an exemplary embodiment of the present invention.

The flexible fabric plenum will also have air flow holes 72 with a specified amount of holes and diameter for each cell and a certain height of diode, which is shown in FIG. 7.

The height of diode, number of vent holes 72 and diameter of holes would depend on air flow distribution feeding time and inflation volume area. Other holes 74 are illustrated in the attached FIGURES although holes 74 are solely provided as locating features for placement of the vertical sew lines 62 and 64 as inflation gas is not intended to pass through holes or openings 74.

The flexible fabric plenum is sewn into the two sides with straight vertical or substantially vertical sew lines 62 and 64 (the amount of sew lines will depend on the numbers of cushion cells).

Figure 9:
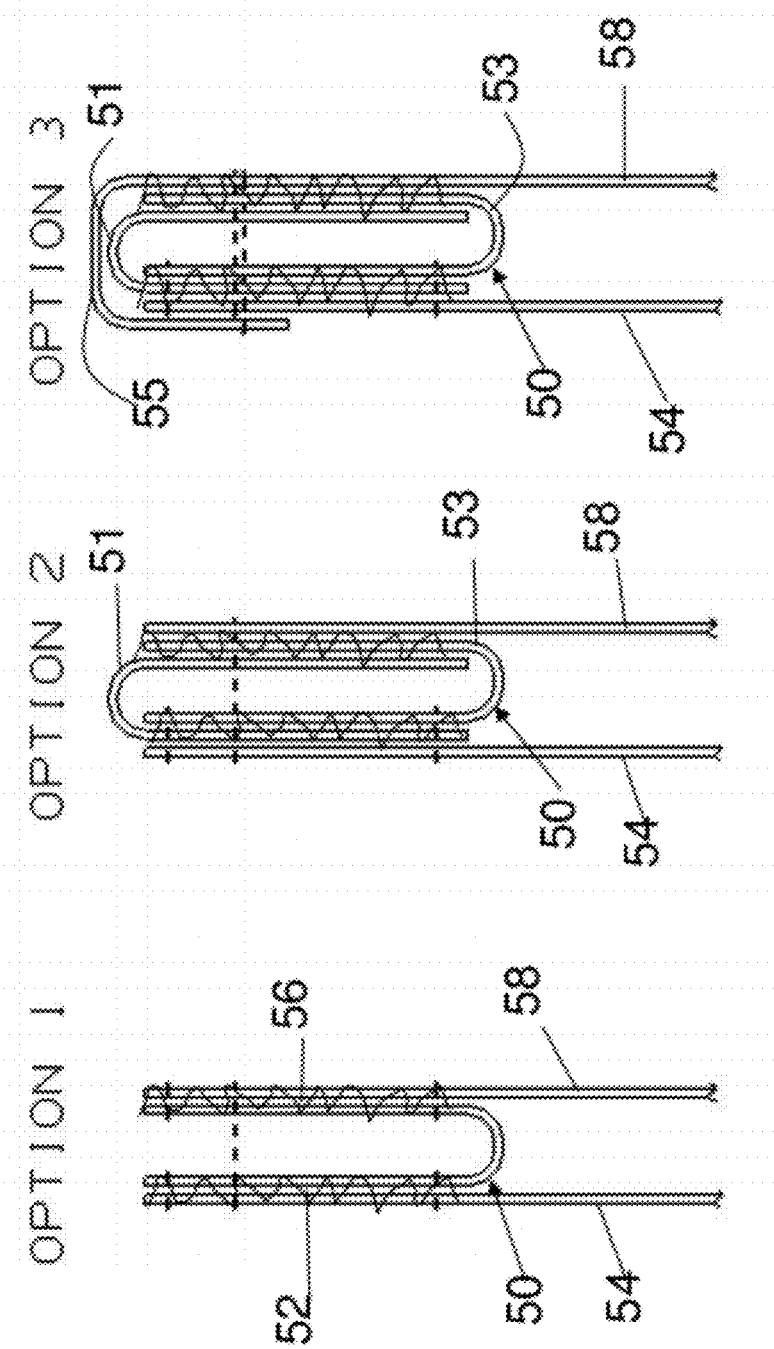
FIG. 9 are views of alternative configurations of exemplary embodiments of the present invention.

FIG. 9 shows alternative plenum configurations. In some embodiments the plenum sewing will increase the time that the cushion will remain inflated since there will be at least four separate piles or stitches sewn together at the top of the inflatable cushion.

Referring now to FIGS. 10-13 alternative exemplary fabric diffuser tubes are illustrated. As shown in FIG. 10 a diffuser tube 120 has one open end secured to an inflator 122 with any suitable type of securement means. Here the tube 120 is in essence a lined hose with a sewn or closed end 124 and a periphery of holes 126 along the length of the tube. In order to provide the desired performance and in one non-limiting exemplary embodiment, the lined hose has one or more outer layers of woven fabric such as a synthetic fiber like polyester or nylon filament with an inner layer or coating bonded to the inside of the outer layer, the inner layer or coating comprising synthetic rubbers such as styrene butadiene, ethylene propylene, chloroprene, polyurethane, and nitrile butadiene.

Referring now to FIGS. 11A-11C an alternative to the FIG. 10 embodiment is illustrated. Here the tube 120 is rolled inwardly in the directions of arrows 128 until a shape similar to that illustrated in FIG. 11B is provided during inflation the tube unrolls or expands outwardly in a direction opposite to arrows 128 to provide the configuration illustrated in FIG. 11C, wherein openings 126 provide the inflation gas to the inflatable cushion. In one embodiment, the tube is formed from multiple fabric layers. In another embodiment, and similar to the FIG. 10 embodiment, the tube is a lined hose with a sewn or closed end 124 and a periphery of holes 126 along the length of the tube. In order to provide the desired performance and in one non-limiting exemplary embodiment, the lined hose has one or more outer layers of woven fabric such as a synthetic fiber like polyester or nylon filament with an inner layer or coating bonded to the inside of the outer layer, the inner layer or coating comprising synthetic rubbers such as styrene butadiene, ethylene propylene, chloroprene, polyurethane, and nitrile butadiene. Of course, other suitable materials are contemplated to be within the scope of exemplary embodiments of the present invention.

Figure 12:
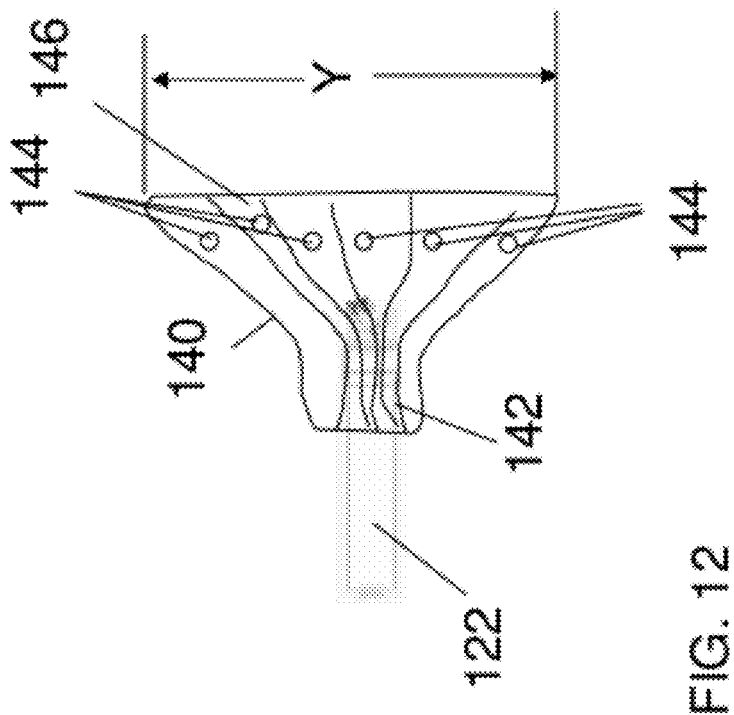

Referring now to FIG. 12 still another alternative exemplary embodiment is illustrated, here a diffuser 140 comprises a coated fabric that is gathered and pleated to create a neck portion 142 that is secured to the inflator by any suitable means such as a band clamp. In this embodiment, the fabric (e.g., nylon or other suitable materials) is coated with a sealant (e.g., silicon or other suitable materials) in order to provide the desired performance. Here the diffuser has a plurality of inflation openings 144 along its surface and a distal end 146 of the diffuser has an extended length Y with respect to the neck portion secured to the inflator. In addition, the inflation openings are located proximate to the distal end of the diffuser to provide greater inflation gas distribution along end 146.

Figure 13:
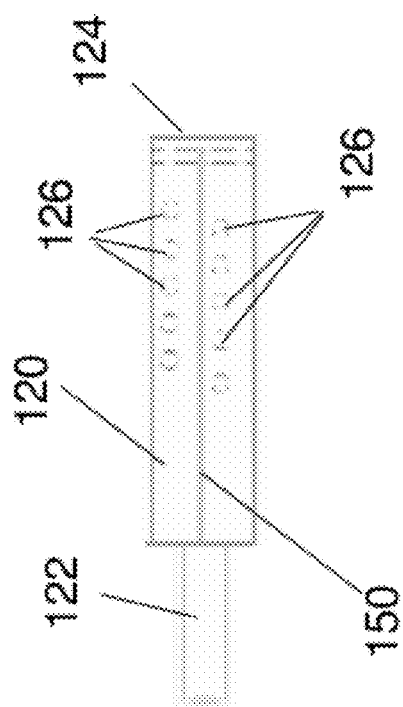

In FIG. 13 still another embodiment is illustrated here the diffuser is similar to the embodiment of FIGS. 11A-11C however, the fabric of the diffuser that is rolled along its length has a sealing agent 150 disposed between the layers. The sealing agent will provide some resistance to the expanding diffuser (e.g., in the directions opposite to arrows 128) thus and in order to allow expansion of the rolled layers the inflating diffuser must have an internal pressure that provides a force that overcomes the sealing agent disposed between the layers. Similar to the embodiment of FIGS. 11A-11C the diffuser tube 120 is rolled inwardly in the directions of arrows 128 until a shape similar to that illustrated in FIG. 11B is provided and during inflation the tube unrolls or expands outwardly in a direction opposite to arrows 128 to provide the configuration illustrated in FIG. 11C.

Figure 8:
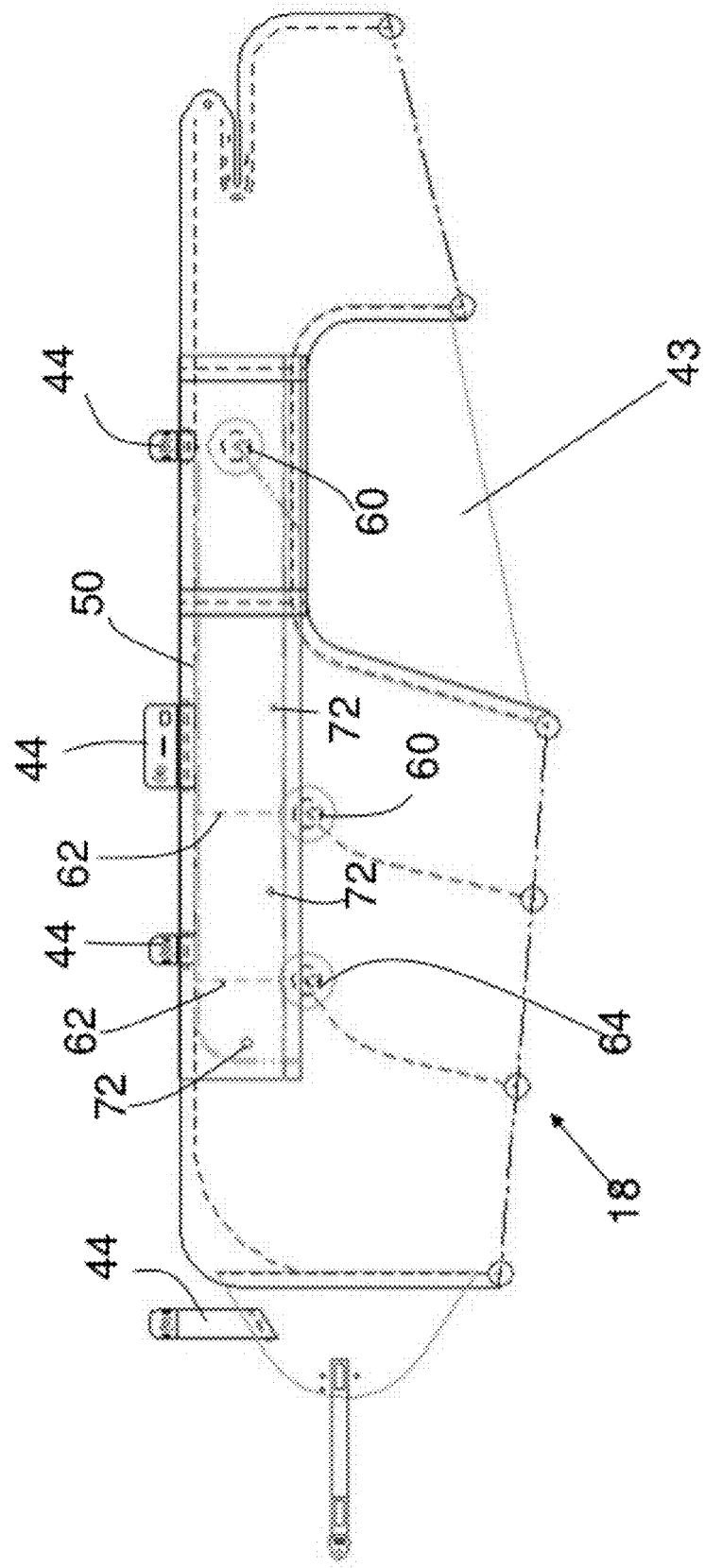

In any of the aforementioned embodiments, the diffuser is configured to supply the inflation gas from the inflator to the cells of the inflatable cushion, wherein only a limited amount of inflation gas is transferred from cell to cell. This is accomplished by sewing diode circles or semi-circular patterns 60 as shown in FIGS. 2, 7 and 8 to the first and second sheet of the inflatable cushion and as also described in U.S. Non-Provisional patent application Ser. No. 11/190,499 filed Jul. 26, 2005 and U.S. Non-Provisional patent application Ser. No. 12/256,224 filed Oct. 22, 2008 the contents each of which are incorporated herein by reference thereto.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An inflatable cushion for a side of a vehicle, the inflatable cushion, comprising:
   a first cushion section formed from a first sheet of material secured to a second sheet of material, the first cushion section having a plurality of separate inflatable cells each of which having an inlet opening for receipt of an inflation gas;
   an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first sheet of material and an upper portion of the second sheet of material; and
   a fabric diffuser member located in the internal passageway, the fabric diffuser member being sealed at one end and open on another end for receipt of an inflation gas, the fabric diffuser being configured to supply the inflation gas to each of the plurality of separate inflatable cells through a plurality of inflation openings, wherein a height of the fabric diffuser in an inflated configuration is less than a length of the fabric diffuser in the inflated configuration and wherein the fabric diffuser is rolled inwardly to define an un-inflated configuration, the height of the fabric diffuser in the un-inflated configuration being less than the height of the fabric diffuser when it is in an inflated configuration.

2. The inflatable cushion as in claim 1, further comprising means for restricting fluid flow between the plurality of inflatable cells by limiting fluid flow between an exterior portion of the fabric diffuser member and an interior surface of the internal passageway proximate to an edge of the inlet openings of the plurality of inflatable cells.

3. The inflatable cushion as in claim 2, wherein the means for restricting fluid flow between the plurality of inflatable cells is a plurality of discrete stitching patterns securing the first and second sheet of the inflatable cushion together proximate to a lower portion of the fabric diffuser.

4. The inflatable cushion as in claim 1, wherein a sealant is disposed between layers of the fabric diffuser as it is rolled into the un-inflated configuration and the fabric diffuser is formed from a plurality of fabric layers.

5. The inflatable cushion as in claim 4, further comprising means for restricting fluid flow between the plurality of inflatable cells by limiting fluid flow between an exterior portion of the fabric diffuser member and an interior surface of the internal passageway proximate to an edge of the inlet openings of the plurality of inflatable cells.

6. The inflatable cushion as in claim 5, wherein the means for restricting fluid flow between the plurality of inflatable cells is a plurality of discrete stitching patterns securing the first and second sheet of the inflatable cushion together proximate to a lower portion of the fabric diffuser.

7. An inflatable cushion for a side of a vehicle, the inflatable cushion, comprising:
 a first cushion section formed from a first sheet of material secured to a second sheet of material, the first cushion section having a plurality of separate inflatable cells each of which having an inlet opening for receipt of an inflation gas;
 an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first sheet of material and an upper portion of the second sheet of material; and
 a fabric diffuser member located in the internal passageway, the fabric diffuser member being sealed at one end and open on another end for receipt of an inflation gas, the fabric diffuser being configured to supply the inflation gas to each of the plurality of separate inflatable cells through a plurality of inflation openings, wherein a height of the fabric diffuser in an inflated configuration is less than a length of the fabric diffuser in the inflated configuration and wherein the fabric diffuser comprises at least one outer layer of a woven fabric with an inner layer or coating bonded to an inside of the at least one outer layer, further comprising:
 means for restricting fluid flow between the plurality of inflatable cells by limiting fluid flow between an exterior portion of the fabric diffuser member and an interior surface of the internal passageway proximate to an edge of the inlet openings of the plurality of inflatable cells, wherein the means for restricting fluid flow between the plurality of inflatable cells is a plurality of discrete stitching patterns securing the first and second sheet of the inflatable cushion together proximate to a lower portion of the fabric diffuser.

8. The inflatable cushion as in claim 7, wherein the at least one outer layer is a synthetic fiber selected from the group comprising polyester, nylon filament or combinations thereof and the inner layer or coating is a synthetic rubber selected from the group comprising: styrene butadiene, ethylene propylene, chloroprene, polyurethane, and nitrile butadiene.

9. An inflatable cushion for a side of a vehicle, the inflatable cushion, comprising:
 a first cushion section formed from a first sheet of material secured to a second sheet of material the first cushion section having a plurality of separate inflatable cells each of which having an inlet opening for receipt of an inflation gas;
 an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first sheet of material and an upper portion of the second sheet of material; and
 a fabric diffuser member located in the internal passageway, the fabric diffuser member being sealed at one end and open on another end for receipt of an inflation gas, the fabric diffuser being configured to supply the inflation gas to each of the plurality of separate inflatable cells through a plurality of inflation openings, wherein a height of the fabric diffuser in an inflated configuration is less than a length of the fabric diffuser in the inflated configuration and wherein the fabric diffuser comprises at least one outer layer of a woven fabric with an inner layer or coating bonded to an inside of the at least one outer layer, wherein the fabric diffuser is rolled inwardly to define an un-inflated configuration, the height of the fabric diffuser in the un-inflated configuration being less than the height of the fabric diffuser when it is in an inflated configuration.

10. The inflatable cushion as in claim 9, wherein a sealant is disposed between layers of the fabric diffuser as it is rolled into the un-inflated configuration.

11. The inflatable cushion as in claim 10, wherein the at least one outer layer is a synthetic fiber selected from the group comprising polyester, nylon filament or combinations thereof and the inner layer or coating is a synthetic rubber selected from the group comprising: styrene butadiene, ethylene propylene, chloroprene, polyurethane, and nitrile butadiene.

12. The inflatable cushion as in claim 10, further comprising means for restricting fluid flow between the plurality of inflatable cells by limiting fluid flow between an exterior portion of the fabric diffuser member and an interior surface of the internal passageway proximate to an edge of the inlet openings of the plurality of inflatable cells.

13. The inflatable cushion as in claim 12, wherein the means for restricting fluid flow between the plurality of inflatable cells is a plurality of discrete stitching patterns securing the first and second sheet of the inflatable cushion together proximate to a lower portion of the fabric diffuser.

14. An airbag module for a vehicle, comprising:
 a side curtain inflatable cushion comprising:
  a first cushion section formed from a first sheet of material secured to a second sheet of material, the first cushion section having a plurality of separate inflatable cells each of which having an inlet opening for receipt of an inflation gas;
  an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first sheet of material and an upper portion of the second sheet of material;
  a fabric diffuser member located in the internal passageway, the fabric diffuser member being sealed at one end and open on another end for receipt of an inflation gas, the fabric diffuser being configured to supply the inflation gas to each of the plurality of separate inflatable cells through a plurality of inflation openings, wherein a height of the fabric diffuser in an inflated configuration is less than a length of the fabric diffuser in the inflated configuration and wherein the fabric diffuser is rolled inwardly to define an un-inflated configuration, the height of the fabric diffuser in the un-inflated configuration being less than the height of the fabric diffuser when it is in an inflated configuration; and
  an inflator for providing the inflation gas, the inflator being fluidly coupled to the fabric diffuser member.

15. The airbag module as in claim 14, further comprising means for restricting fluid flow between the plurality of inflatable cells by limiting fluid flow between an exterior portion of the fabric diffuser member and an interior surface of the internal passageway proximate to an edge of the inlet openings of the plurality of inflatable cells.

16. The airbag module as in claim 15, wherein the means for restricting fluid flow between the plurality of inflatable cells by limiting fluid is a plurality of discrete stitching patterns securing the first and second sheet of the inflatable cushion together proximate to a lower portion of the fabric diffuser.

17. The airbag module as in claim 14, wherein a sealant is disposed between layers of the fabric diffuser as it is rolled into the un-inflated configuration.

18. The airbag module as in claim 17, further comprising means for restricting fluid flow between the plurality of inflatable cells by limiting fluid flow between an exterior portion of the fabric diffuser member and an interior surface of the internal passageway proximate to an edge of the inlet openings of the plurality of inflatable cells.

19. The airbag module as in claim 18, wherein the means for restricting fluid flow between the plurality of inflatable cells is a plurality of discrete stitching patterns securing the first and second sheet of the inflatable cushion together proximate to a lower portion of the fabric diffuser.

20. An airbag module for a vehicle, comprising:
a side curtain inflatable cushion comprising:
a first cushion section formed from a first sheet of material secured to a second sheet of material, the first cushion section having a plurality of separate inflatable cells each of which having an inlet opening for receipt of an inflation gas;
an internal passageway formed in the first cushion section, the internal passageway linking and fluidly coupling to each of the plurality of separate inflatable cells via the inlet opening of each of the plurality of separate inflatable cells, the internal passageway being formed by an upper portion of the first sheet of material and an upper portion of the second sheet of material;
a fabric diffuser member located in the internal passageway, the fabric diffuser member being sealed at one end and open on another end for receipt of an inflation gas, the fabric diffuser being configured to supply the inflation gas to each of the plurality of separate inflatable cells through a plurality of inflation openings, wherein a height of the fabric diffuser in an inflated configuration is less than a length of the fabric diffuser in the inflated configuration and wherein the fabric diffuser is comprises at least one outer layer of a woven fabric with an inner layer or coating bonded to an inside of the at least one outer layer;
an inflator for providing the inflation gas, the inflator being fluidly coupled to the fabric diffuser member; and
further comprising means for restricting fluid flow between the plurality of inflatable cells by limiting fluid flow between an exterior portion of the fabric diffuser member and an interior surface of the internal passageway proximate to an edge of the inlet openings of the plurality of inflatable cells wherein the means for restricting fluid flow between the plurality of inflatable cells by limiting fluid flow is a plurality of discrete stitching patterns securing the first and second sheet of the inflatable cushion together proximate to a lower portion of the fabric diffuser.

21. The airbag module as in claim 20, wherein the at least one outer layer is a synthetic fiber selected from the group comprising polyester, nylon filament or combinations thereof and the inner layer or coating is a synthetic rubber selected from the group comprising: styrene butadiene, ethylene propylene, chloroprene, polyurethane, and nitrile butadiene.

* * * * *